United States Patent [19]

Lynch

[11] Patent Number: 4,568,994

[45] Date of Patent: Feb. 4, 1986

[54] WARP RESISTANT-DIMENSIONALLY STABLE JACKET FOR MAGNETIC RECORDING DISK

[75] Inventor: Gregory R. Lynch, Saratoga, Calif.

[73] Assignee: Memron, Inc., San Jose, Calif.

[21] Appl. No.: 540,030

[22] Filed: Oct. 7, 1983

[51] Int. Cl.[4] ............................................. G11B 23/02
[52] U.S. Cl. .................................... 360/133; 206/313; 206/444
[58] Field of Search ................. 360/97, 133, 128, 137; 206/444, 353, 313; 428/900

[56] References Cited

U.S. PATENT DOCUMENTS

| | | | |
|---|---|---|---|
| 3,317,038 | 5/1967 | Bade et al. | 206/313 |
| 4,038,693 | 7/1977 | Huffine | 360/99 |
| 4,251,843 | 2/1981 | Masuyama et al. | 360/137 |
| 4,354,213 | 10/1982 | Martinelli | 360/133 |
| 4,375,658 | 3/1983 | Martinelli | 360/128 |
| 4,413,298 | 11/1983 | Pecsok et al. | 360/133 |

*Primary Examiner*—John H. Wolff
*Attorney, Agent, or Firm*—John J. Leavitt

[57] ABSTRACT

A floppy disk jacket assembly including the jacket and floppy disk of a magnetic recording assembly in which the jacket if formed from a complex ester formed by polymerization or condensation and commonly known as polyester. The jacket is formed of two identical flat sheets of polyester juxtaposed so that their peripheral edges coincide. The peripheral edges constitute a homogeneous mass of the polyester to form a sealed pocket.

16 Claims, 7 Drawing Figures

U.S. Patent  Feb. 4, 1986  Sheet 1 of 2  4,568,994
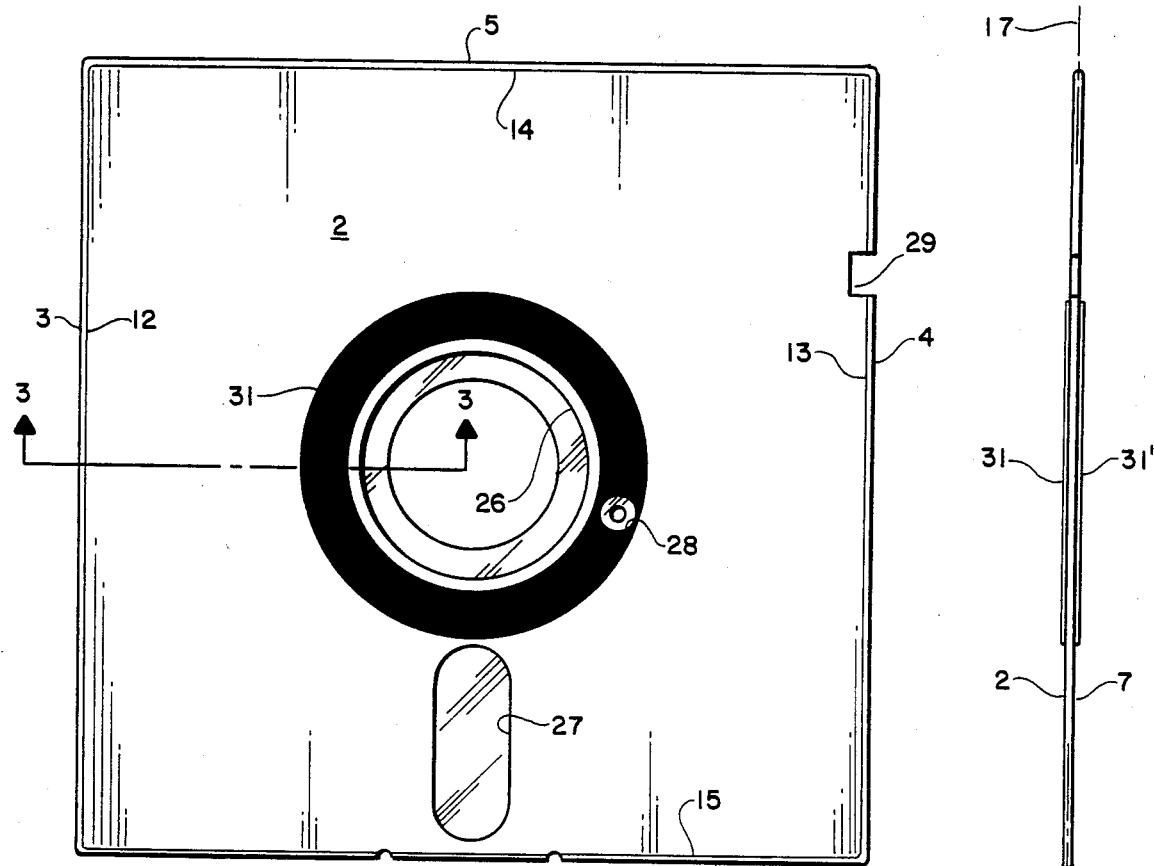
FIG. 1
FIG. 2
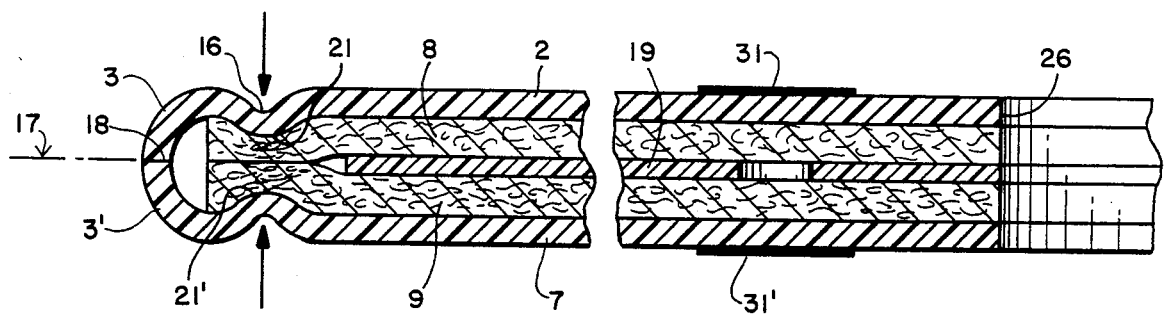
FIG. 3

WARP RESISTANT-DIMENSIONALLY STABLE JACKET FOR MAGNETIC RECORDING DISK

BACKGROUND OF THE INVENTION

1. Field of the Invention

This invention relates to cartridge assemblies of the type used to record data on a magnetizable medium, usually in the form of a thin, pliable disk, sometimes referred to as a "floppy" disk, and particularly to the jacket that encloses the magnetizable disk.

2. Description of the Prior Art

The prior art related to the subject invention is believed found in Class 360, sub-classes, 133, 135, 99 and 128; and Class 428, sub-class 900. A search through this field of search has indicated the existence of four United States patents as follows:

U.S. Pat. No. 4,038,693
U.S. Pat. No. 4,375,658
U.S. Pat. No. 4,354,213
U.S. Pat. No. 4,251,843

U.S. Pat. No. 4,038,693 relates to a jacket material of high electrical insulating characteristics having an inside surface of electrically conductive material for draining away electrostatic charge from the enclosed floppy disk. The jacket may be fabricated from flexible vinyl sheet material such as polyvinyl chloride, but preferably, polyvinyl chloride acetate. There is no teaching in this patent of the use of a polyester as the jacket material.

U.S. Pat. No. 4,251,843 relates to a disk jacket fabricated from polyvinyl chloride. There is no teaching in this patent of the use of polyester as the material from which a floppy disk jacket might be fabricated.

U.S. Pat. No. 4,354,213 teaches that polyester as a lubricant is used in the fabrication of the floppy disk, and suggests the use of polyester fibers for the formation of an antistatic liner normally found in the inside of a floppy disk jacket. Nothing is found in this patent to suggest the use of polyester as the material from which the jacket as a whole should or could be fabricated.

U.S. Pat. No. 4,375,658 teaches the use of Lexan polycarbonate material for the floppy disk jacket. There is no teaching in this patent of a floppy disk jacket fabricated from polyester material.

It will be readily seen from the above discussion of the prior art that polyvinyl chloride, polyvinyl chloride acetate and Lexan polycarbonate materials are commonly used in the fabrication of floppy disk jackets. It has been found, however, that polyvinyl chloride and polyvinyl chloride acetate jackets are highly susceptible to warpage due to heat cycling, thus rendering the jackets and the data contained on the disk within the jacket substantially useless for several reasons. One such reason is the amount of torque required to rotate the disk within the warped jacket. Obviously, if the jacket warps, frictional forces are imposed on the disk that are not ordinarily present. The amount of force (torque) required to rotate the disk is important because if too much torque is required the disk will wear more rapidly, it will not remain perfectly flat during operation, thus affecting the reliability of the data "written" on the disk or "read" from it. For instance, the starting torque recommended to the American National Standards Institute, Inc. amounts to only 1.42 ounce-force-inches for a two-sided double-density unformatted 5.25 inch flexible disk cartridge. The running torque for the same disk is recommended at no more than 4.6 ounce-force-inches. For a one-sided single-density unformatted 5.25 inch flexible disk cartridge the running torque is recommended at no more than 3.5 ounce-force-inches. Accordingly, it is one of the objects of the present invention to provide a floppy disk jacket and floppy disk assembly that operates within these parameters, despite temperature cycling to temperatures above 125° F. at which the polyvinyl chloride-type jackets start a softening process that is detrimental to the reliability of the assembly in use.

Surprisingly, to my knowledge, polyester materials have not been used for the fabrication of floppy disk jackets despite some rather important disadvantages of the polyvinyl chloride materials. At least one of these disadvantages is the use of plasticizers in the polyvinyl chloride materials to render them pliable. It has been found that the plasticizers migrate out of the material over time, contributing to embrittlement of the material and a greater tendency to warp and stay warped when subjected to heat cycling. For instance, the American National Standards Institute, Inc. recommends that the disk shall withstand operation and storage temperatures at the surface of the disk cartridge in the range from 50° F. to 125° F. at a relative humidity of 8% to 80%. It will of course be understood that in many of our southern states the upper limit of this temperature range is easily exceeded in the trunk of an automobile, where cartridge assemblies are apt to be stored. While the heat may not injure the disk itself, it wreaks havoc with the jacket within which it is enclosed. Accordingly, it is another object of the invention to provide a jacket for a floppy disk cartridge assembly that is dimensionally stable and remains flat even at high temperatures that would destroy a jacket fabricated from polyvinyl chloride material.

A still further object of the invention is the provision of a jacket for a floppy disk cartridge assembly in which the jacket is formed from a polyester material.

Yet another object of the invention is the fabrication of a jacket for a floppy disk wherein the tabs conventionally folded over the body of the jacket and secured thereto to form the jacket are eliminated, thus minimizing the edge thickness of the jacket.

Still another object of the invention is the provision of a floppy disk jacket fabricated from polyester material and having three side edges fused together to form a pocket having one open side into which a floppy disk may be inserted.

Another object of the invention is the provision of a floppy disk jacket structure that lends itself to mass production techniques.

Another object of the invention is the provision of a floppy disk jacket fabricated from polyester and having a fiber liner secured to the inside surfaces of the sides of the jacket.

Conventional floppy disk jackets are fabricated from polyvinyl blanks that are folded mediany to form two sides of the jacket, with integral tabs on three side edges of one of the sides foldable in such a way that they overlap the other side, to which they are secured by heat staking or adhesive. After formation of the pocket in this manner, the floppy disk is inserted into the open side of the jacket and the final tab is folded over and secured to enclose the floppy disk. Accordingly, it is one of the objects of the present invention to eliminate the necessity of folding the floppy disk jacket material, and to eliminate the necessity of providing or folding edge tabs in the jacket material to form a pocket.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the warp-resistant, dimensionally stable floppy disk jacket of the invention comprises a jacket fabricated from polyester material. Polyester is a complex ester formed by polymerization or condensation, polymerization constituting a chemical reaction in which two or more small molecules combine to form a larger molecule. Polyester material may be either thermoplastic or thermo-setting. In either case, the capability of this material to withstand temperature cycling is considerably greater than the capability of polyvinyl chloride to withstand such temperature cycling.

BRIEF DESCRIPTION OF THE DRAWINGS

FIG. 1 is a side elevational view illustrating one broad side of a polyester jacket of the invention.

FIG. 2 is an edge view of the polyester jacket of the invention.

FIG. 3 is an enlarged fragmentary vertical cross-sectional view taken in the plane indicated by the line 3—3 of FIG. 1.

DESCRIPTION OF THE PREFERRED EMBODIMENT

In terms of greater detail, the warp-resistant, dimensionally stable floppy disk jacket of the invention comprises a jacket as illustrated in FIG. 1, fabricated from a polyester material as distinguished from polyvinyl chloride, polyvinyl chloride acetate, and Lexan polycarbonate material.

Figure 4:
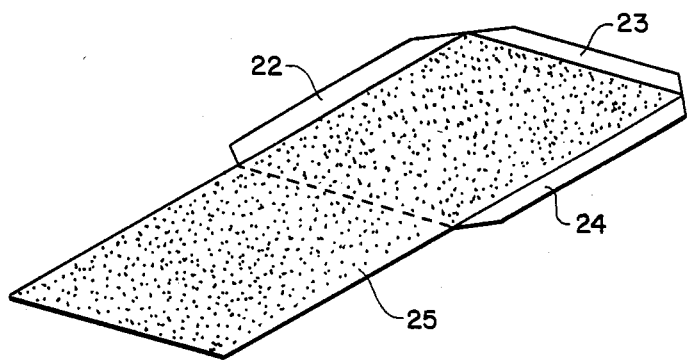
FIG. 4 is a perspective view of a conventional polyvinyl chloride floppy disk jacket blank prior to folding and illustrating the laterally extending tabs utilized to hold the jacket together.
Figure 5:
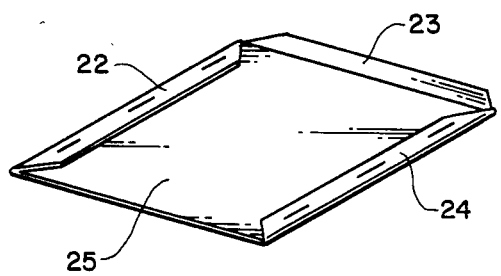
FIG. 5 is a perspective view illustrating the conventional polyvinyl chloride floppy disk jacket after it has been folded into a semi-completed condition, one of the laterally extending tabs being left unfolded while two have been folded over onto the underlying portion of the floppy disk jacket and heat staked thereto.
Figure 6:
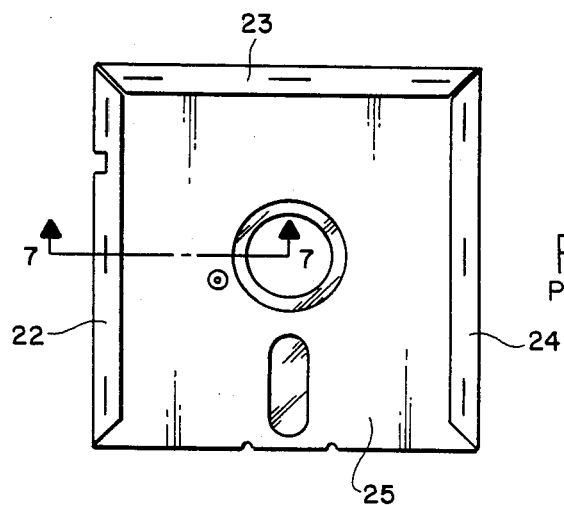
FIG. 6 is a plan view of a completed conventional polyvinyl chloride floppy disk jacket with all of the tabs superimposed over the underlying portion of the jacket and heat staked thereto to form a closed pocket enclosing the floppy disk.
Figure 7:
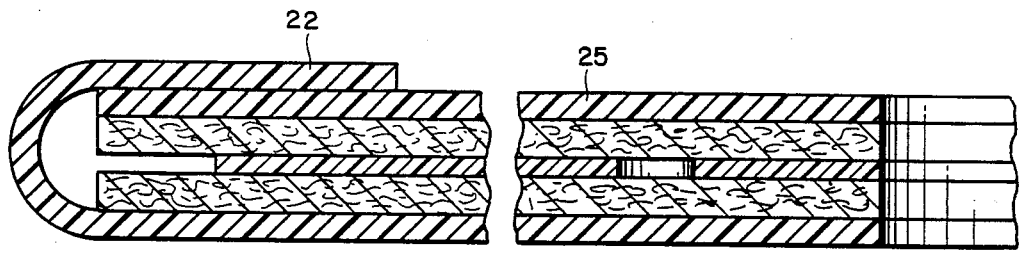
FIG. 7 is an enlarged fragmentary cross-sectional view taken in the plane indicated by the line 7—7 in FIG. 6.

Conventional polyvinyl chloride floppy disk jackets are fabricated as illustrated in FIGS. 4 through 7, inclusive, the polyvinyl chloride material being stamped into a blank as illustrated in FIG. 4, provided with score lines as indicated therein, and folded as indicated in FIG. 5 with the application of heat to soften the material in order to make an adequate fold. The jacket may be processed to provide the various apertures (illustrated in FIG. 6) while the jacket is still in blank form (FIG. 4), or these apertures may be provided in the jacket in its partially folded condition as illustrated in FIG. 5. Subsequently, the floppy disk is inserted in the pocket as seen in FIG. 5, and the last remaining tab is folded over and heat staked or otherwise secured, as by adhesive, to the underlying layer of the polyvinyl chloride jacket material. Obviously, because of the necessity for great accuracy in the positioning of the various apertures, in either case this process is controlled to close tolerances so that the completed assembly as illustrated in FIG. 6 will be compatible with the computer equipment with which the floppy disk and the data recorded thereon is to be used.

To provide an even better understanding of the structural differences between the polyester jacket as illustrated in FIGS. 1 through 3, and the polyvinyl chloride jacket as illustrated in FIGS. 4 through 7, FIG. 7 illustrates in a substantially enlarged cross-sectional view, the construction of the polyvinyl chloride jacket as distinguished from the construction of the polyester jacket as illustrated in enlarged cross-section in FIG. 3. The differences in these two structures will be elaborated upon subsequently.

Referring to FIGS. 1, 2 and 3, the polyester jacket for floppy disks there illustrated comprises a first flat side 2, having side edges 3 and 4 and top and bottom edges 5 and 6 as illustrated. This side 2 is superimposed over a similarly dimensioned second flat side 7 having similar edges which coincide with the edge of the first flat side 2. In the interest of clarity, the edges 3 and 3' of flat sides, 2 and 7 have been illustrated in enlarged scale. These side members 2 and 7 are cut by an appropriate means, such as shearing, to substantially exact dimensions to provide square pieces of polyester having dimensions recommended by the Computer and Business Manufacturers Association to the American National Standards Institute Inc., for the purpose of promulgating dimensions for these floppy disk jackets for all manufacturers in the interest of uniformity of size. For the floppy disk jacket illustrated, the width and height dimension of the jacket, i.e., the length of the edges 3-4 and 5-6 is 5.250 inches, plus or minus 0.015 inches.

Adhering to the same close tolerances, the sides may be apertured prior to superposition, or may be apertured in pairs after superposition and placement of a pair of liner members 8 and 9 therebetween. Alternatively, stacks of side members may be appropriately clamped and all the side members in the stack may be apertured in a single operation.

In the assembly illustrated, the two sides 2 and 7, each having a fibrous liner 8 and 9, respectively, attach thereto, conveniently by adhesive or by heat staking (not shown), are superposed one upon the other and a precisely fitting die is brought into contact very close to the peripheral edges of the jacket sides 2 and 7, generally along a line 12 lying parallel to the edge 3, a line 13 lying parallel to the edge 4, a line 14 lying next adjacent to and parallel to the edge 5, and a line 15 lying parallel and adjacent to the edge 6. Because of the dimensional constraints for floppy disk jackets imposed for the sake of uniformity of size, the die contact lines 12–15 lie no more than 0.625" from the associated edge. The die has the capability of imposing pressure and heat to the associated sheet of polyester between the lines 12–15 and the associated edges, causing in each instance formation of an elongated indentation as at 16, (FIG. 3). The indentation is formed simultaneously from both sides of the jacket assembly, so as to rigidly hold the two jacket sides pinched together and permit fusing of the edges 3 and 3' (and edges 4-4', 5-5' and 6-6') of the associated polyester sides 2 and 7 along a median plane designated generally by the numeral 17, so that the two associated edges of the sides 2 and 7 fuse together along the median plane as indicated at 18. In the drawing (FIG. 3) there is shown a jointure line at 18, but in point of fact, the material forming the jacket fuses at this point and no line actually exists.

It will thus be seen that the floppy disk 19 lies captured between the two fibrous mats 8 and 9. The purpose of the two fibrous mats is to clean the surface of the floppy disk and simultaneously to protect the magnetized surface of the floppy disk against damage due to scratches, etc. In some instances, it may be that the protective fibrous mats 8 and 9 may be fabricated from an electrically conductive material so as to drain off electrostatic charges that might build up on the floppy disk 19. In any event, it should be noted that the fibrous mats 8 and 9, in an edge portion next adjacent the edges of the polyester sides 2 and 7, lie trapped or pinched between the protuberances 21 formed on the opposite surfaces of the polyester sides 2 and 7 from the lines 12, 13, 14 and 15 as illustrated. The mats 8 and 9 therefore lie trapped between the inner surfaces of the jacket, and serve to form a protective pocket for the floppy disk 19. Additionally, in as much as protuberances 21 impinge and squeeze the thickness of the mats 8 and 9 together, this tends to anchor the mats and prevents their shifting within the jacket thus formed. It is important that the position of the mats be stabilized so as to prevent encroachment of the mat edges in the apertures formed in the jacket sides.

It is also important to note that by virtue of the method of sealing the lateral edges of the assembly or cartridge thus formed, there is eliminated from the construction of the jacket the tabs 22, 23 and 24 as illustrated in FIG. 4, and the necessity of folding these tabs over upon the portion 25 of the jacket illustrated in FIG. 5. Because of elimination of the tabs, there is no difficulty in meeting the thickness requirements imposed by the American National Standards Institute, Inc. for floppy disk cartridges. In this respect, the Institute requires that the nominal thickness of the cartridge assembly be within the range of 0.048" to 0.067" measured inwardly from the outer peripheral portions which include the folded tabs as illustrated in FIGS. 4 through 7. The edge thickness for a conventional jacket, including the tabs, is given as 0.055 to 0.075 inches, thus permitting a substantially thicker edge portion for the conventional polyvinyl chloride jacket than the nominal thickness of the cartridge spaced inwardly from the edges. Obviously, the only reason for such a requirement is the fact that no better way has heretofore been found to fabricate the floppy disk jackets, and it was necessary to accommodate the thickness of the material in the region of the folds and tabs. Now that this new method and material has been discovered to form floppy disk jackets and assemblies, it will be very easy to adhere to the dimensional requirements imposed by the National Institute.

As illustrated in FIG. 1, the polyester jacket of the invention is provided with a central aperture designated generally by the numeral 26, which is precisely located in the sides 2 and 7 so that when these sides are superimposed one upon the other, the axes of the two apertures in the two sides 2 and 7 coincide. In like manner, the two sides 2 and 7 are punched simultaneously with the punching of the aperture 26 to provide the head aperture 27 and the indexing aperture 28 and the "write-enable" notch 29 as illustrated. All of these various apertures and notches may be formed in the sides 2 and 7 of polyester material simultaneously so as to achieve the greatest degree of accuracy possible. In fact, it is contemplated forming these apertures in a continuous strip which is then cut to length to define a side. When the two sides 2 and 7 are superimposed one upon the other, the apertures and notches coincide and cooperate with the peripheral equipment used in computer technology to either "write" data on the magnetizable surface of the floppy disk 19, or to "read" such data therefrom.

One of the requirements that must be met in the manufacture of floppy disk jackets such as that illustrated in FIGS. 1 and 6, is that the light transmittance of the jacket must not exceed one percent at every point contained within an annular band, here designated by the numeral 31, the edges of which band lie generally tangent to the edges of the index aperture 28. In conventional polyvinyl chloride jackets, this requirement has been met by fabricating the jackets from black polyvinyl chloride having the requisite light transmittance restriction. With the jacket forming the subject matter of this invention, namely, fabricated from polyester material, the jacket may be transparent except within the area defined by the annular band 31 as illustrated in FIGS. 1 and 3, and the transmittance may be controlled in the instant polyester jacket by depositing a layer of opaque ink or other material in an annular band as illustrated. Obviously, other means of meeting the transmissivity requirement may be used, such as polyester formulated to provide the required opacity, or by an auxiliary band adhesively secured to the jacket, or a decorative layer covering the entire side of the jacket.

From the foregoing, it will be seen that a new construction for a floppy disk jacket has been presented, having advantages of increased wear resistance, tensil strength approximately ten times the strength of polyvinyl chloride, and formed from a material that does not require a plasticizer, thus eliminating the problem of embrittlement of the jacket with passage of time. Additionally, the polyester jacket of the invention is heat sealable around the peripheral edges in such a manner as to completely enclose the pocket within which is nested the fragile floppy disk 19, thus capturing the floppy disk 19 in a way that prevents its being removed. The polyester material is warp resistant in that it is capable of withstanding much higher temperatures, nominally up to 175° F., thus improving its capability of withstanding high storage temperatures and high operating temperatures. It is well known that in many of the modern floppy disk drives, the operating temperature of the equipment exceeds the maximum 125° F. temperature set by the National Institute, some of these temperatures ranging as high as 150° F.

While I have described heat sealing of the two sides by application of a heated die and the application of pressure, it will be apparent to those skilled in the art that other methods of sealing may be used. These include adhesives and radio frequency welding.

Having thus described the invention, what is believed to be new and novel and sought to be protected by Letters Patent of the United States is as follows:

I claim:

1. A jacket assembly for a floppy disk comprising:
  (a) a jacket formed substantially from polyester material and fuse-sealed around its peripheral edges; and (b) a magnetizable floppy disk rotatably disposed within said fuse-sealed jacket, whereby said peripheral edges of the jacket are fused together in a manner to eliminate overlapping of one edge portion of the jacket by another edge portion of the jacket.

2. The combination according to claim 1, in which a fibrous liner is provided associated with the interior surface of each side of said jacket and disposed on opposite sides of said floppy disk.

3. The combination according to claim 2, in which the peripheral edge of said jacket are sealed under heat and pressure to impose a clamping action on the peripheral edges of said fibrous mats, thus locking said fibrous mats in position, and forming a homogenious mass of the peripheral edges of said jacket.

4. The combination according to claim 1, in which the peripheral edges of said jacket are an integrally fused homogenious mass of polyester material.

5. The combination according to claim 4, in which said jacket is formed from two substantially identical apertured sheets of polyester material juxtaposed so that their corresponding edges and apertures coincide, a pair of fibrous apertured mats disposed between said two substantially identical sheets of polyester material whereby said polyester sheets lie spaced apart a distance corresponding to the thickness of said fibrous mats and the apertures in the mats coincide with the apertures in said polyester sheets; said floppy disk rotatably disposed between said pair of fibrous mats; the corresponding coincident edges of said polyester sheets being a homogenious mass and forming an enclosed pocket within which said floppy disk lies sealed.

6. The combination according to claim 5, in which said substantially identical polyester sheets are provided with mutually reaching protuberances spaced inwardly from said fused edges whereby the distance between said sheets at the location of said protuberances is less than the distance between said sheets in the region opposite said floppy disk to clamp said fibrous mats.

7. The combination according to claim 6, in which said floppy disk has a circular periphery, said jacket has a square periphery, and said protuberances are radially spaced outwardly from the circular periphery of the floppy disk.

8. The combination according to claim 1, in which said jacket is provided with a central aperture, a head aperture, an indexing aperture and a write-enable notch, and means are provided on said jacket on both sides thereof constituting an opaque band on said jacket concentric with said central aperture and encompassing the indexing aperture, said band having a light transmissivity of less than 1%.

9. The combination according to claim 1, in which the thickness of said fuse-sealed peripheral edges of said jacket is no more than the thickness of the remainder of the jacket.

10. The combination according to claim 1, in which said jacket possesses a light transmissivity of less than 1%.

11. The combination according to claim 1, in which said fuse-sealed peripheral edges embody no more than two thicknesses of said polyester material.

12. The combination according to claim 1, in which said jacket formed from polyester material is of substantially uniform thickness over its entire expanse from edge-to-edge.

13. A jacket for a floppy disk comprising:
(a) two substantially identical apertured sheets of polyester material superposed one above the other in spaced parallel relation so that their corresponding edges and apertures coincide,
(b) said coinciding corresponding edges being fuse-sealed to one another, whereby said peripheral edges of the jacket are fused together in a manner to eliminate overlapping of one edge portion of the jacket by another edge portion of the jacket.

14. The combination according to claim 13, in which a pair of fibrous apertured mats are disposed in the space between said two substantially identical sheets of polyester material whereby the apertures in the mats coincide with the apertures in said two polyester sheets.

15. The combination according to claim 13, in which each of said two substantially identical apertured sheets possess a light transmissivity of less than 1%.

16. The combination according to claim 13, in which said two substantially identical apertured sheets of polyester material are equally spaced on opposite sides of a median plane, and said coincident corresponding edges are fuse-sealed in said median plane.

* * * * *